US012036771B2

(12) United States Patent
Haider et al.

(10) Patent No.: US 12,036,771 B2
(45) Date of Patent: Jul. 16, 2024

(54) FLEXIBILIZED POLYURETHANES FOR FLEXIBLE PACKAGING ADHESIVE WITHOUT AROMATIC AMINE MIGRATION

(71) Applicant: Covestro LLC, Pittsburgh, PA (US)

(72) Inventors: Karl W. Haider, Wexford, PA (US); Raymond Zeliznik, Bradford Woods, PA (US); Philip Jones, Gibsonia, PA (US); Tina Kasardo, McKeesport, PA (US)

(73) Assignee: Covestro LLC, Pittsburgh, PA (US)

( * ) Notice: Subject to any disclaimer, the term of this patent is extended or adjusted under 35 U.S.C. 154(b) by 0 days.

(21) Appl. No.: 18/214,685

(22) Filed: Jun. 27, 2023

(65) Prior Publication Data
US 2023/0356508 A1    Nov. 9, 2023

Related U.S. Application Data

(62) Division of application No. 16/986,612, filed on Aug. 6, 2020, now abandoned.

(51) Int. Cl.
| | | |
|---|---|---|
| B32B 17/10 | (2006.01) | |
| B32B 17/06 | (2006.01) | |
| C09J 175/04 | (2006.01) | |

(52) U.S. Cl.
CPC ........ B32B 17/1077 (2013.01); B32B 17/061 (2013.01); C09J 175/04 (2013.01)

(58) Field of Classification Search
CPC ... C08G 18/6423; C08G 18/325; C08G 18/48
See application file for complete search history.

(56) References Cited

U.S. PATENT DOCUMENTS

| | | | |
|---|---|---|---|
| 3,169,949 A | 2/1965 | Buning | |
| 6,355,829 B2 | 3/2002 | Roesler et al. | |
| 7,754,782 B2 | 7/2010 | Heckroth et al. | |
| 8,119,245 B2 | 2/2012 | Kendi et al. | |
| 9,499,654 B2 | 11/2016 | Nakao et al. | |
| 2006/0011295 A1* | 1/2006 | Danielmeier | C08G 18/6651 156/330.9 |
| 2008/0058468 A1* | 3/2008 | Younes | C08G 18/482 524/589 |
| 2014/0357828 A1 | 12/2014 | Eggert et al. | |
| 2015/0166715 A1 | 6/2015 | Heckroth et al. | |
| 2016/0024339 A1* | 1/2016 | Squiller | C08G 18/3821 524/589 |
| 2016/0083593 A1* | 3/2016 | Marauska | C08G 18/6423 521/163 |
| 2020/0010723 A1 | 1/2020 | Takeno | |

FOREIGN PATENT DOCUMENTS

| | | |
|---|---|---|
| CN | 107216842 A | 9/2017 |
| CN | 110256996 A | 9/2019 |
| CN | 110845685 A | 2/2020 |
| EP | 3560973 A1 | 10/2019 |
| JP | H11246646 A | 9/1999 |
| JP | 2010248303 A | 11/2010 |
| JP | 2014005364 A | 1/2014 |
| WO | 2019109327 A1 | 6/2019 |
| WO | 2021023841 A1 | 2/2021 |

OTHER PUBLICATIONS

Johnson, Randy A.; Ashland Performance Materials; "New Fast Curing Aliphatic Laminating Adhesives Reduce Waste and Energy Consumption"; 2008 AIMCAL Fall Technical Conference; Oct. 19-22, 2008, Myrtle Beach, SC.
Qiu, Fengxian et al, "Preparation, optical properties and 12 polymeric thermo-optic switch of polyurethane-urea", Materials Chemistry and Physics, Elsevier SA, vol. 135, No. 2, May 6, 2012, pp. 518-523.
Szycher (Structionre-Property Relations in Polyurethanes from : Szycher's Handbook of Polyyrethanes CRC Press. Published online on Jul. 13, 2021).

* cited by examiner

*Primary Examiner* — Michael M Dollinger
(74) *Attorney, Agent, or Firm* — John E. Mrozinski, Jr.; Richard P. Bender

(57) ABSTRACT

Provided is an adhesive comprising a reaction product of (A1) an aliphatic isocyanate having an NCO group content of 18 to 64 and (A2) a polyol or polyamine having a molecular weight of from 400 to 4000; and (B) a polyaspartate compound, wherein viscosity of the adhesive, as measured @ 23° C. according to ASTM D4212-16, remains below 60 seconds for after four hours, and wherein the adhesive develops an acceptable bond strength to a substrate, defined as having a minimum of 150 g/in. measured @ 23° C. according to ASTM D 1876-01 or substrate tear, in less than or equal to five days after the substrate is laminated with the adhesive. The adhesives are free of aromatic amines and may find use in multi-layered laminated films for the production of flexible packaging useful in a variety of industries, including the food processing, cosmetics, and detergents industries.

15 Claims, No Drawings

FLEXIBILIZED POLYURETHANES FOR FLEXIBLE PACKAGING ADHESIVE WITHOUT AROMATIC AMINE MIGRATION

CROSS REFERENCE TO RELATED APPLICATIONS

The present application is a divisional application of U.S. patent application Ser. No. 16/986,612, filed Aug. 6, 2020, the contents of which is incorporated herein by reference.

FIELD OF THE INVENTION

The present invention relates in general to adhesives, and more specifically to flexibilized polyurea compositions for producing flexible packaging adhesives and the resulting multi-layered laminated films produced using these adhesives.

BACKGROUND OF THE INVENTION

Flexible packagings intended for the packaging of diverse products, such as those manufactured by the food processing, cosmetics or detergents industries, are usually made of several thin layers (sheets or films). The thickness of these layers is generally between 5 μm and 150 μm and may comprise several different materials, such as paper, metal (e.g., aluminum) or thermoplastic polymers. The corresponding multilayer laminate, which may have a thickness of from 20 μm to 400 μm, makes it possible to combine the properties of the different individual layers of material to provide the consumer with a combination of characteristics suitable for the final flexible packaging. Such characteristics include, but are not limited to visual appearance, a barrier effect (to atmospheric moisture or to oxygen), contact with food without risk of toxicity or of modification to the organoleptic properties of the packaged foodstuffs, chemical resistance for certain products, such as ketchup or liquid soap, and good behavior at high temperature, for example in the case of pasteurization.

In conventional multilayer flexible packaging, two component (2K) polyurethane adhesive compositions are typically used to laminate the layers. These compositions are oftentimes based on polyurethane systems that employ aromatic polyisocyanates. After the adhesive is applied and the films are laminated, the films are wound onto large rolls and are stored at elevated temperatures for several days to allow for any unreacted polyisocyanate monomer to complete curing. If this curing step is eliminated, or is of insufficient length, the laminates may suffer from two problems: first, the mechanical strength of the adhesive bond may not be sufficient for further handling and use of the laminated packaging film; and second, unreacted monomeric aromatic polyisocyanates can react with moisture in the product to be packaged, generating monomeric aromatic polyamines, which may migrate into the contents of the package. This is particularly problematic in high performance packaging systems, which are subjected to elevated temperatures (e.g., 116-130° C.) during sterilization of the packaging material and contents (retort process).

The packaging industry is continually trying to identify adhesive solutions to eliminate this aromatic amine migration problem for health and safety reasons, while maintaining the cure speeds to which they are accustomed with conventional two component (2K) aromatic polyisocyanate-based adhesives. One approach has been to replace the aromatic polyisocyanate component in the two component (2K) polyurethane adhesive composition with aliphatic polyisocyanates. Although this approach eliminates the potential for aromatic amine formation, the lower reactivity observed with the use of aliphatic isocyanates leads to a much slower cure time. As a result, the rolled films must be stored for a much longer time (potentially up to two weeks) compared with the two to three day cure of the aromatic isocyanate-based adhesives.

Polyaspartate resins are well-known in the coatings industry. These polyaspartates are typically used in conjunction with various aliphatic polyisocyanates to produce hard, durable coatings, which can be used in applications such as floor coatings and industrial coatings. Common commercial polyaspartates are typically based on the Michael Addition product of relatively low molecular weight diamines with $\alpha,\beta$-unsaturated diesters such as diethyl maleate. Suitable low molecular weight diamines include cycloaliphatic diamines such as 4,4'-methylenebiscyclohexylamine (PACM 20), 3,3'-dimethyl-4,4'-diaminodicyclohexylmethane (LAROMIN C260) or on the acyclic aliphatic diamine 2-methylpentamethylenediamine (DYTEK A).

The polyaspartate resins described above have the advantage of relatively high reactivity with aliphatic polyisocyanates, compared to that of hydroxyl-terminated resins. Furthermore, this reactivity can be readily "tuned" by varying the diamine or polyamine on which they are based and/or controlling the amount of water present, either in the resins themselves, or in the ambient environment during cure. However, these systems when cured with conventional low molecular weight polyisocyanates produce hard, rather inflexible coatings which would be unsuitable for flexible packaging applications.

Thus, there continues to exist in the art a need for adhesive compositions that, 1) can meet the mechanical requirements necessary for a film lamination adhesive, 2) do not suffer from aromatic amine migration, and 3) have sufficient cure speed so that extended cure times are not required to meet these requirements.

SUMMARY OF THE INVENTION

The present invention provides adhesives that: 1) meet the mechanical requirements necessary for a film lamination adhesive; 2) do not suffer from aromatic amine migration; 3) have sufficient pot-life to facilitate ease of application to the films to be laminated, and 4) have sufficient cure speed so that extended cure times are not required to meet these requirements. The adhesives of the invention may find use in the production of multi-layered laminated films, such as those useful in the flexible packagings market, where aromatic amine migration is a concern such as food, medical, cosmetics, and detergents packaging.

These and other advantages and benefits of the present invention will be apparent from the Detailed Description of the Invention herein below.

DETAILED DESCRIPTION OF THE INVENTION

The present invention will now be described for purposes of illustration and not limitation. Except in the operating examples, or where otherwise indicated, all numbers expressing quantities, percentages, and so forth in the specification are to be understood as being modified in all instances by the term "about."

Any numerical range recited in this specification is intended to include all sub-ranges of the same numerical precision subsumed within the recited range. For example, a range of "1.0 to 10.0" is intended to include all sub-ranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited in this specification is intended to include all lower numerical limitations subsumed therein and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein. All such ranges are intended to be inherently described in this specification such that amending to expressly recite any such sub-ranges would comply with the requirements of 35 U.S.C. § 112(a), and 35 U.S.C. § 132(a). The various embodiments disclosed and described in this specification can comprise, consist of, or consist essentially of the features and characteristics as variously described herein.

Any patent, publication, or other disclosure material identified herein is incorporated by reference into this specification in its entirety unless otherwise indicated, but only to the extent that the incorporated material does not conflict with existing definitions, statements, or other disclosure material expressly set forth in this specification. As such, and to the extent necessary, the express disclosure as set forth in this specification supersedes any conflicting material incorporated by reference herein. Any material, or portion thereof, that is said to be incorporated by reference into this specification, but which conflicts with existing definitions, statements, or other disclosure material set forth herein, is only incorporated to the extent that no conflict arises between that incorporated material and the existing disclosure material. Applicant reserves the right to amend this specification to expressly recite any subject matter, or portion thereof, incorporated by reference herein.

Reference throughout this specification to "various non-limiting embodiments," "certain embodiments," or the like, means that a particular feature or characteristic may be included in an embodiment. Thus, use of the phrase "in various non-limiting embodiments," "in certain embodiments," or the like, in this specification does not necessarily refer to a common embodiment, and may refer to different embodiments. Further, the particular features or characteristics may be combined in any suitable manner in one or more embodiments. Thus, the particular features or characteristics illustrated or described in connection with various or certain embodiments may be combined, in whole or in part, with the features or characteristics of one or more other embodiments without limitation. Such modifications and variations are intended to be included within the scope of the present specification.

The grammatical articles "a", "an", and "the", as used herein, are intended to include "at least one" or "one or more", unless otherwise indicated, even if "at least one" or "one or more" is expressly used in certain instances. Thus, these articles are used in this specification to refer to one or more than one (i.e., to "at least one") of the grammatical objects of the article. By way of example, and without limitation, "a component" means one or more components, and thus, possibly, more than one component is contemplated and may be employed or used in an implementation of the described embodiments. Further, the use of a singular noun includes the plural, and the use of a plural noun includes the singular, unless the context of the usage requires.

In one embodiment of the present invention, flexibility is introduced into the polyisocyanate component through preparation of an aliphatic NCO-terminated prepolymer, which is combined with one or more polyaspartate resins, either alone or in admixture with a polyol component, to form either a polyurea or a polyurethane/polyurea hybrid adhesive. The molecular weight of the polyol used to make, or to be combined with polyaspartate and reacted with the prepolymer, as well as the NCO content of the prepolymer may be fine-tuned to achieve the appropriate mechanical properties. The present invention is directed to prepolymers based on polyols in the 400-4000 MW range in polyisocyanate prepolymers having an NCO content of from 3-25% NCO. Polyol components used to prepare the prepolymer may be any of the polyols known to those skilled in the art with backbones such as a C3 or C4 polyether, polyester, polycarbonate, polycarbonate ester, polycaprolactone, polybutadiene, etc. In selected embodiments, renewable content may be introduced into the prepolymer by including a polyol based on renewable components, e.g., bio-based succinic acid or bio-based 1,3-propanediol Additionally, the polyol component of the prepolymer could be replaced by an amine-terminated polymer, resulting in an isocyanate-terminated polyurea prepolymer, based on any of the backbones that are known in the art, including for example, those that are described herein as the polyol component.

The adhesives of this invention may also be prepared by combining the aliphatic polyisocyanate functional prepolymers described herein with aliphatic polyisocyanates, or by using aliphatic polyisocyanates alone, prior to reaction with the polyaspartate or mixture of polyaspartate and polyol resins. Additionally, suitable polyurethanes may be prepared by using polyaspartates based on high molecular weight polyamines, described in co-assigned U.S. Provisional Patent Application Ser. No. 62/884,205, filed Aug. 8, 2019 and entitled, "FLEXIBLE POLYUREAS FOR FLEXIBLE PACKAGING ADHESIVE WITHOUT AROMATIC AMINE MIGRATION" in combination with the polyurethane prepolymers of this invention. Those skilled in the art will also recognize that the polyaspartate resins may be combined with polyols and chain extenders prior to reacting with the aliphatic isocyanate terminated prepolymer and/or aliphatic polyisocyanate.

In a first aspect, the present invention is directed to an adhesive comprising a reaction product of (A) an isocyanate-terminated prepolymer having an NCO group content of from 3% to 25% and an average functionality of 2 to 6, comprising a reaction product of (A1) an aliphatic isocyanate having an NCO group content of 18 to 64; and (A2) a polyol or polyamine having a molecular weight of from 400 to 4000; and (B) a polyaspartate compound according to formula (I)

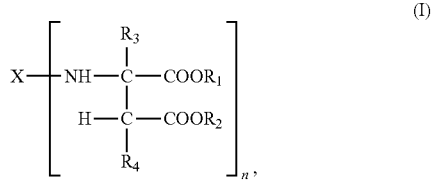

wherein, X represents a linear or branched aliphatic group obtained by removing amino groups from a linear or branched aliphatic polyamine, $R_1$ and $R_2$ are identical or different and represent organic groups which are inert towards isocyanate groups at a temperature of 100° C. or less, $R_3$ and $R_4$ are identical or different and represent hydrogen or organic groups which are inert towards isocyanate groups at a temperature of 100° C. or less, n represents an integer with a value of at least 2, wherein viscosity of the adhesive, as measured @ 23° C. according to ASTM D4212-16, remains below 60 seconds after four hours, and wherein the adhesive develops an acceptable bond strength to a substrate, defined as having a minimum of 150 g/in. measured @ 23° C. according to ASTM D 1876-01 or substrate tear, in less than or equal to five days after the substrate is laminated with the adhesive. Such polyols include, but are not limited to, those based on a polyether, a polyester, a polycarbonate, a polycarbonate ester, a polycaprolactone and a polybutadiene. Alternatively, the adhesive may be prepared by combining the polyol or polyamine component (A2) with the polyaspartate (component B) and reacting with an aliphatic isocyanate-terminated prepolymer (A) or with an aliphatic polyisocyanate monomer (A1) instead of or in addition to the prepolymer (A).

In a second aspect, the present invention is directed to a multi-layered laminated film comprising the adhesive according to the previous paragraph applied to one or more substrate layers selected from the group consisting of paper, metal and thermoplastic polymers, wherein each substrate layer has a thickness of from 5 μm to 250 μm, and wherein the laminated film has a total thickness of from 20 μm to 750 μm.

In a third aspect, the invention is directed to a process of minimizing aromatic amine migration in a packaging material, the process comprising: applying the adhesive according to the first aspect of the invention to a packaging material substrate.

In a fourth aspect, the invention is directed to an adhesive comprising a reaction product of (A1) an aliphatic isocyanate having an NCO group content of 18 to 64; (A2) a polyol or polyamine having a molecular weight of from 400 to 4000; and (B) a polyaspartate compound according to formula (I)

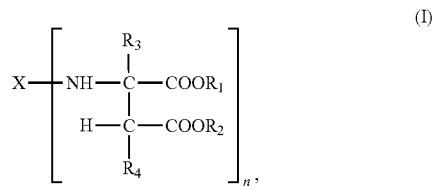

wherein, X represents a linear or branched aliphatic group obtained by removing amino groups from a linear or branched aliphatic polyamine, $R_1$ and $R_2$ are identical or different and represent organic groups which are inert towards isocyanate groups at a temperature of 100° C. or less, $R_3$ and $R_4$ are identical or different and represent hydrogen or organic groups which are inert towards isocyanate groups at a temperature of 100° C. or less, n represents an integer with a value of at least 2, wherein viscosity of the adhesive, as measured @ 23° C. according to ASTM D4212-16, remains below 60 seconds after four hours, and wherein the adhesive develops an acceptable bond strength to a substrate, defined as having a minimum of 150 g/in. measured @ 23° C. according to ASTM D 1876-01 or substrate tear, in less than or equal to five days after the substrate is laminated with the adhesive.

As used herein, the term "polymer" encompasses prepolymers, oligomers and both homopolymers and copolymers; the prefix "poly" in this context referring to two or more. As used herein, the term "molecular weight", when used in reference to a polymer, refers to the number average molecular weight, unless otherwise specified.

The terms "adhesive" or "adhesive composition", refer to any substance that can adhere or bond two items together. Implicit in the definition of an "adhesive composition" or "adhesive formulation" is the concept that the composition or formulation is a combination or mixture of more than one species, component or compound, which can include adhesive monomers, oligomers, and polymers along with other materials.

The aromatic amine-free adhesives described herein comprise a two-component adhesive composition. As used herein, the term "two-component" refers to an adhesive or adhesive composition comprising at least two components that must be stored in separate containers because of their mutual reactivity. For instance, two-component polyurea adhesive systems and compositions may comprise a hardener/crosslinker component comprising an isocyanate-functional compound, and a separate binder component comprising an amino-functional compound. The two separate components are generally not mixed until shortly before application because of the limited pot-life of the mixture. When the two separate components are mixed and applied as a film on a substrate, the mutually reactive compounds in the two components react to crosslink and form a cured adhesive film As used herein, the term "polyurethane" refers to polymeric or oligomeric materials comprising urethane groups, urea groups, or both. Accordingly, as used herein, the term "polyurethane" is synonymous with the terms polyurea, polyurethane/urea, and modifications thereof. The term "polyurethane" also refers to crosslinked polymer networks in which the crosslinks comprise urethane and/or urea linkages, and/or the constituent polymer chains comprise urethane and/or urea linkages.

As used herein, the term "polyol" refers to compounds comprising at least two free hydroxyl groups. Polyols include polymers comprising pendant and terminal hydroxyl groups.

As used herein, the term "polyamine" refers to compounds comprising at least two free primary and/or secondary amine groups. Polyamines include polymers comprising at least two pendant and/or terminal amine groups.

As used herein, the term "polyaspartate" refers to compounds comprising the reaction product of at least one polyamine with at least one Michael acceptor. Polyaspartates include polymers comprising at least two pendant and/or terminal secondary amine groups.

As used herein, the term "prepolymer" refers to a material capable of undergoing polymerization to form a polymer having a molecular weight higher than that of the material before polymerization. In some embodiments, the prepolymer can be a pre-formed polymer having reacting groups and being capable of further polymerization to form a polymer of a higher molecular weight.

As used herein, the term "polyisocyanate" refers to compounds comprising at least two un-reacted isocyanate groups. Polyisocyanates include diisocyanates and diisocyanate reaction products comprising, for example, biuret, isocyanurate, uretdione, urethane, urea, iminooxadiazine dione, oxadiazine dione, carbodiimide, acyl urea, allophanate groups, the like or a combination thereof. The term "aliphatic polyisocyanates" also includes cycloaliphatic polyisocyanates.

Suitable aliphatic polyisocyanates (A1) include, but are not limited to, 1,4-tetramethylene diisocyanate, 1,5-pentamethylene diisocyanate (PDI),1,6-hexamethylene diisocyanate (HDI), 5-Isocyanato-1-(isocyanatomethyl)-1,3,3-trimethylcyclohexane (IPDI), trimers of 1,6-hexamethylene diisocyanate (HDI), trimers of 1,5-pentamethylene diisocyanate (PDI), trimers of 5-isocyanato-1-(isocyanatomethyl)-1,3,3-trimethylcyclohexane (IPDI), biurets of 1,6-hexamethylene diisocyanate (HDI), biurets of 1,5-pentamethylene diisocyanate (PDI), allophanates of 1,6-hexamethylene diisocyanate (HDI), allophanates of 1,5-pentamethylene diisocyanate (PDI), allophanates of 5-Isocyanato-1-(isocyanatomethyl)-1,3,3-trimethylcyclohexane (IPDI), allophanates of trimers of 1,6-hexamethylene diisocyanate (HDI), allophanates of trimers of 1,5-pentamethylene diisocyanate, 5-Isocyanato-1-(isocyanatomethyl)-1,3,3-trimethylcyclohexane, 2,2,4-trimethyl-hexamethylene diisocyanate, dodecamethylene diisocyanate, 2-methyl-1,5-diisocyanatopentane, 1,4-diisocyanatocyclohexane, 2,4-diisocyanato-dicyclohexyl-methane, 4,4'-diisocyanato-dicyclohexyl-methane, 1,3-bis (isocyanatomethyl)-cyclohexane, 1,4-bis (isocyanatomethyl)-cyclohexane, 1-isocyanato- 1-methyl-3 (4)-isocyanatomethyl-cyclohexane (IMCI), bis(4-isocyanato-3-methyl-cyclohexyl)-methane, 1,4-cyclohexane diisocyanate (CHDI), and mixtures thereof. Monomeric polyisocyanates containing three or more isocyanate groups, such as 4-isocyanatomethyl-1,8-octamethylene diisocyanate can also be used.

The polyols and polyamines (A2) useful in producing the prepolymers (A) of the present invention include, but are not limited to, diols, triols, and higher alcohols and polymeric polyols and polyamines such as those based on polyethers, polyesters, polycarbonates, polycarbonate esters, polycaprolactones, and polybutadienes.

Examples of polyether polyols include poly(oxytetramethylene) polyols, poly(oxyethylene) polyols and polyoxypropylene polyols. The polyether polyols suitable for the invention may be formed from the oxyalkylation of various polyols, for example, glycols such as ethylene glycol, 1,4-butane glycol, 1,6-hexanediol, and the like, or higher functionality polyols, such as trimethylol propane, pentaerythritol and the like. One commonly utilized oxyalkylation method is the reaction of a polyol with an alkylene oxide, for example, ethylene and/or propylene oxide, in the presence of a basic catalyst or a double metal cyanide catalyst.

Polyester polyols can also be used as a polymeric polyol component in the certain embodiments of the invention. The polyester polyols can be prepared by the polyesterification of organic polycarboxylic acids or anhydrides thereof with organic polyols. Preferably, the polycarboxylic acids and polyols are aliphatic or aromatic dibasic acids and diols.

The diols which may be employed in making the polyester include alkylene glycols, such as ethylene glycol and butylene glycol, neopentyl glycol and other glycols such as cyclohexane dimethanol, caprolactone diol (for example, the reaction product of caprolactone and ethylene glycol), polyether glycols, for example, poly(oxytetramethylene) glycol and the like. However, other diols of various types and, as indicated, polyols of higher functionality may also be utilized in various embodiments of the invention. Such higher functionality polyols can include, for example, trimethylol propane, trimethylol ethane, pentaerythritol, and the like, as well as higher molecular weight polyols such as those produced by oxyalkylating low molecular weight polyols.

The acid component of the polyester consists primarily of monomeric carboxylic acids or anhydrides having 2 to 18 carbon atoms per molecule. Among the acids which are useful are phthalic acid, isophthalic acid, terephthalic acid, tetrahydrophthalic acid, hexahydrophthalic acid, adipic acid, azelaic acid, sebacic acid, maleic acid, glutaric acid, chlorendic acid, tetrachlorophthalic acid and other dicarboxylic acids of varying types. Also, there may be employed higher polycarboxylic acids such as trimellitic acid and tricarballylic acid (where acids are referred to above, it is understood that the anhydrides of those acids which form anhydrides can be used in place of the acid). Also, lower alkyl esters of acids such as dimethyl glutamate can be used.

In addition to polyester polyols formed from polybasic acids and polyols, polycaprolactone-type polyesters can also be employed. These products are formed from the reaction of a cyclic lactone such as ε-caprolactone with a polyol containing primary hydroxyls such as those mentioned above. Such products are described in U.S. Pat. No. 3,169,949.

Suitable hydroxy-functional polycarbonate polyols may be those prepared by reacting monomeric diols (such as 1,4-butanediol, 1,6-hexanediol, di-, tri- or tetraethylene glycol, di-, tri- or tetrapropylene glycol, 3-methyl-1,5-pentanediol, 4,4'-dimethylolcyclohexane and mixtures thereof) with diaryl carbonates (such as diphenyl carbonate, dialkyl carbonates (such as dimethyl carbonate and diethyl carbonate), alkylene carbonates (such as ethylene carbonate or propylene carbonate), or phosgene. Optionally, a minor amount of higher functional, monomeric polyols, such as trimethylolpropane, glycerol or pentaerythritol, may be used.

Also, polyamines may be used alone or in combination with the aforementioned polyols. The wide range of molecular weight, amine functionality, repeating unit type, and distribution can provide flexibility in the design of new compounds or mixtures. Examples of polyamines useful for preparing the aliphatic isocyanate-terminated prepolymers of the invention (A) include amine-terminated polyether polyols based on poly(oxytetramethylene) glycols.

Also useful are amine-terminated polyethers made from an appropriate initiator to which lower alkylene oxides, such as ethylene oxide, propylene oxide, butylene oxide, or mixtures thereof, are added with the resulting hydroxyl-terminated polyol then being aminated. Where two or more oxides are used, they may be present as random mixtures or as blocks of one or the other polyether. In the amination step, it is highly desirable that the terminal hydroxyl groups in the polyol be essentially all secondary hydroxyl groups for ease of amination. Normally, the amination step does not completely replace all of the hydroxyl groups. However, the majority of hydroxyl groups are replaced by amine groups. Therefore, in some embodiments, the amine-terminated polyethers have greater than 50% of their active hydrogens in the form of amine hydrogens. If ethylene oxide is used, it is desirable to cap the hydroxyl-terminated polyol with a small amount of higher alkylene oxide to ensure that the terminal hydroxyl groups are essentially all secondary hydroxyl groups. The polyols so prepared are then reductively aminated by known techniques, for example, as described in U.S. Pat. No. 3,654,370.

In some embodiments of the invention, a single polyamine may be used. Also, mixtures of high molecular weight polyamines, such as mixtures of di- and trifunctional materials and/or different molecular weight or different chemical composition materials, may be used.

Commercially available polyamines include the JEFFAMINE series of amine-terminated polyethers from Huntsman Corp., such as, JEFFAMINE D-2000, JEFFAMINE D-4000, JEFFAMINE T-3000 and JEFFAMINE T-5000; and POLYETHERAMINE D 230, POLYETHERAMINE D 400, POLYETHERAMINE T 403 and POLYETHERAMINE T 5000 from BASF.

Amine-terminated polyesters can also be used as the polyamine component useful for preparing the aliphatic isocyanate-terminated prepolymers used in the invention. The amine-terminated polyester polyols can be prepared by amine termination of polyols prepared through the polyesterification of organic polycarboxylic acids or anhydrides thereof with organic polyols. Preferably, the polycarboxylic acids and polyols are aliphatic or aromatic dibasic acids and diols.

The diols which may be employed in making the polyester backbones of the amine-terminated polyamines described above include alkylene glycols, such as ethylene glycol and butylene glycol, neopentyl glycol and other glycols such as cyclohexane dimethanol, caprolactone diol (for example, the reaction product of caprolactone and ethylene glycol), polyether glycols, for example, poly (oxytetramethylene) glycol and the like. However, other diols of various types and, as indicated, polyols of higher functionality may also be utilized in various embodiments of the invention. Such higher polyols can include, for example, trimethylol propane, trimethylol ethane, pentaerythritol, and the like, as well as higher molecular weight polyols such as those produced by oxyalkylating low molecular weight polyols. An example of such high molecular weight polyol is the reaction product of 20 moles of ethylene oxide per mole of trimethylol propane.

The acid component of the polyester backbone of the amine-terminated polyamines described above consists primarily of monomeric carboxylic acids or anhydrides having 2 to 18 carbon atoms per molecule. Among the acids which are useful are phthalic acid, isophthalic acid, terephthalic acid, tetrahydrophthalic acid, hexahydrophthalic acid, adipic acid, azelaic acid, sebacic acid, maleic acid, glutaric acid, chlorendic acid, tetrachlorophthalic acid and other dicarboxylic acids of varying types. Also, there may be employed higher polycarboxylic acids such as trimellitic acid and tricarballylic acid (where acids are referred to above, it is understood that the anhydrides of those acids which form anhydrides can be used in place of the acid). Also, lower alkyl esters of acids such as dimethyl glutamate can be used.

Suitable amine-terminated polycarbonate polyols may be those prepared by amine terminating the reaction products of monomeric diols (such as 1,4-butanediol, 1,6-hexanediol, di-, tri- or tetraethylene glycol, di-, tri- or tetrapropylene glycol, 3-methyl-1,5-pentanediol, 1,4,-dimethylolcyclohexane and mixtures thereof) with diaryl carbonates (such as diphenyl carbonate, dialkyl carbonates (such as dimethyl carbonate and diethyl carbonate), alkylene carbonates (such as ethylene carbonate or propylene carbonate), or phosgene. Optionally, a minor amount of higher functional, monomeric polyols, such as trimethylolpropane, glycerol or pentaerythritol, may be used.

As those skilled in the art are aware, polyaspartates may be produced by the reaction of a polyamine with a Michael addition receptor, i.e., an olefin substituted on one or both of the olefinic carbons with an electron withdrawing group such as cyano, keto, or ester (an electrophile) in a Michael addition reaction. Examples of suitable Michael addition receptors include, but are not limited to, acrylates, and diesters such as dimethyl maleate, diethyl maleate, dibutyl maleate, dimethyl fumarate, diethyl fumarate, and dibutyl fumarate.

The polyaspartate (B) includes one or more polyaspartate compounds corresponding to formula (I)

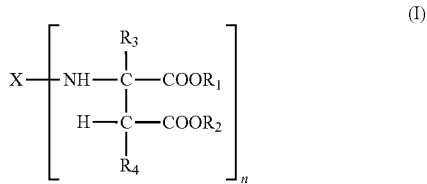

wherein:
n is an integer of at least 2;
X represents an aliphatic residue;
$R_1$ and $R_2$ each independently represent organic groups that are inert to isocyanate groups under reaction conditions; and
$R_3$ and $R_4$ each independently represent hydrogen or organic groups that are inert to isocyanate groups under reaction conditions.

As will be described in further detail, the polyaspartate (B) can be prepared with a variety of polyamines, including low molecular weight polyamines, high molecular weight polyamines, or a combination thereof. Additionally, the polyamines can have a wide range of amine functionality, repeat unit type, distribution, etc. This wide range of molecular weight, amine functionality, repeating unit type, and distribution can provide versatility in the design of new compounds or mixtures.

Suitable low molecular weight polyamines have molecular weights in various embodiments of from 60 to 400, in selected embodiments of from 60 to 300. Suitable low-molecular-weight diamines include, but are not limited to, ethylene diamine, 1,2- and 1,3-diaminopropane, 1,2- 1,3- or 1,4-diamino butane, 1,5-diaminopentane, 1,3-, 1,4- and 1,6-diaminohexane, 1,3-diamino-2,2-dimethyl propane, 2-methyl-1,5-pentane diamine, isophorone diamine, 4,4'-diamino-dicyclohexyl methane, 4,4'-diamino-3,3'-dimethyldicyclohexyl methane, 4,4'-diamino-3,3'-diethyldicyclohexyl methane, 1,4-bis(2-amino-prop-2-yl)-cyclohexane, hydrazine, piperazine, bis(4-aminocyclohexyl)methane, and mixtures of such polyamines. Representative aspartates prepared from these low molecular weight diamines include DESMOPHEN NH-1220, DESMOPHEN NH-1420, and DESMOPHEN NH-1520, all commercially available from Covestro.

In some embodiments of the invention, a single high molecular weight polyamine may be used. Also, mixtures of high molecular weight polyamines, such as mixtures of di-and trifunctional materials and/or different molecular weight or different chemical composition materials, may be used. The term "high molecular weight" is intended to include polyamines having a molecular weight of at least 400 in various embodiments. In selected embodiments, the polyamines have a molecular weight of from 400 to 4,000. Non-limiting examples can include polyethylene glycol bis (amine), polypropylene glycol bis (amine), or polytetramethylene glycol bis (amine), the like, or a combination thereof.

In certain embodiments, the polyamine can be for example, one or more of the JEFFAMINE series of amine-terminated polyethers from Huntsman Corp., such as, JEF- FAMINE D-230, JEFFAMINE D-400, JEFFAMINE D-2000, JEFFAMINE D-4000, JEFFAMINE T-3000 and JEFFAMINE T-5000.

Polyol (C), where included in the inventive adhesive, has a molecular weight of from 400 to 4000 and is selected from polyols known in the art, such as for example, those based on one of a polyether, a polyester, a polycarbonate, a polycarbonate ester, a polycaprolactone, and a polybutadiene.

As can be appreciated by those skilled in the art, the inventive adhesive formulations can be reacted and cured. The viscosity of the inventive adhesive, as measured @ 23° C. according to ASTM D4212-16, remains below 60 seconds after four hours and the adhesive develops an acceptable bond strength to a substrate, defined as having a minimum of 150 g/in. measured @ 23° C. according to ASTM D 1876-01 or substrate tear, in less than or equal to five days after the substrate is laminated with the adhesive.

The present disclosure also describes a method of minimizing aromatic amine migration in multi-layered substrate such as a packaging material. This method includes forming or applying an adhesive as described herein to a substrate of the packaging material and curing the adhesive.

The inventive adhesive can be formed on or applied to a variety of substrates, including multi-layered laminated films such as those for packaging materials or the like, particularly flexible packaging materials. Non-limiting examples of substrates include metals (aluminum, copper, and steel), plastics, wood, cement, concrete, glass, the like, or a combination thereof. The adhesive of the invention can be applied by painting, rolling, pouring, spraying, dipping, casting, dispensing, the like, or a combination thereof. The inventive adhesive and substrate layers may be laminated together by known processes.

In various embodiments, each layer of the multi-layered laminate may have a thickness of from 5 µm to 250 µm and are bonded together by a continuous layer of the inventive adhesive in a crosslinked state.

These processes comprise a step of coating the adhesive over a first layer of a substrate, by deposition of a continuous layer of adhesive with a controlled thickness in various embodiments of less than 100 µm, corresponding to an amount of adhesive (or grammage) which is also controlled, preferably not exceeding 10 g/m². This coating step is followed by a step of laminating a second layer of a substrate, identical to or different from the first by the application, under pressure to the first layer covered with the layer of adhesive. In various embodiments, the inventive multi-layered laminated film has a total thickness of from 20 µm to 750 µm.

To form the final flexible packaging, the multilayer laminate may be slit, cut and sealed. The inventive adhesives optionally may contain additives such as fillers, pigments, softeners, high-boiling liquids, catalysts, UV stabilizers, anti-oxidants, microbiocides, algicides, dehydrators, thixotropic agents, wetting agents, flow enhancers, matting agents, anti-slip agents, aerators, and extenders.

Although the present invention is described and exemplified in the instant Specification in the context of an adhesive, the invention is not intended to be so limited. The principles of the invention are equally applicable to polyurethane, polyurea, polyurethane/urea coatings, adhesives, sealants, composites, castings, and films Flexible packagings made with the inventive aromatic amine-free adhesives may find use in the food processing, cosmetics, and detergents industries, amongst others.

EXAMPLES

The non-limiting and non-exhaustive examples that follow are intended to further describe various non-limiting and non-exhaustive embodiments without restricting the scope of the embodiments described in this specification. The following materials were used in preparing the compositions of the Examples. All quantities given in "parts" and "percents" are understood to be by weight, unless otherwise indicated.

| | |
|---|---|
| POLYISOCYANATE A | a solvent-free, flexibilizing aliphatic polyisocyanate prepolymer based on hexamethylene diisocyanate (HDI) trimer and a polycaprolactone diol (hydroxyl value of 325 mg KOH/g), the prepolymer had an NCO content of 11.0 ± 0.5%; viscosity 6,000 ± 1,200 mPa · s @ 23° C.; |
| POLYISOCYANATE B | an NCO-terminated prepolymer based on hexamethylene diisocyanate and a polypropylene oxide polyether diol (hydroxyl value of 515 mg KOH/g.), the prepolymer had an isocyanate content of 12.5 wt. %; |
| POLYISOCYANATE C | an NCO-terminated allophanate modified prepolymer based on 1, 6-hexamethylene diisocyanate, the prepolymer had an isocyanate content of 6.0 wt. %; |
| POLYISOCYANATE D | an NCO-terminated prepolymer based on 1-isocyanato-3,3,5-trimethyl-5-isocyanato-methylcyclohexane diisocyanate and a blend of polypropylene glycol polyether diols (hydroxyl values of 111 mg KOH/g and 56 mg KOH/g), the prepolymer had an isocyanate content of 3.7 wt. %; |
| POLYISOCYANATE E | an NCO-terminated prepolymer based on 1, 6-hexamethylene diisocyanate and a diethylene glycol and phthalic anhydride polyester diol (hydroxyl value of 320 mg KOH/g), the prepolymer had an isocyanate content of 10.8 wt. %; |
| POLYISOCYANATE F | an NCO terminated prepolymer based on 1, 6-hexamethylene diisocyanate, a diethylene glycol and adipic acid polyester diol (hydroxyl value of 225 mg KOH/g), and a polypropylene glycol polyether diol (hydroxyl value of 111 mg KOH/g), the prepolymer had an isocyanate content of 7.8 wt. %; |
| POLYISOCYANATE G | HDI trimer (isocyanurate) having an average isocyanate content of 21.8 wt. %; |
| POLYISOCYANATE H | an NCO-terminated allophanate modified prepolymer based on 4,4'-diphenylmethane diisocyanate, the prepolymer had an isocyanate content of 16.0 wt. %; |

-continued

| | |
|---|---|
| POLYESTER A | an aliphatic and aromatic polyester diol with a hydroxyl value of approximately 56 mg KOH/g; |
| DIASPARTATE A | a 100% solids content aspartic ester functional amine, having an amine number of approx. 191 mg KOH/g, viscosity @ 25° C. of 1400; |
| DIASPARTATE B | a diaspartate prepared from 4, 4-diaminodicyclohexyl methane and diethyl maleate having an approximate amine value of 204 mg KOH/g; |
| DIASPARTATE C | a diaspartate prepared from 4, 4-diaminodicyclohexylmethane and diethyl maleate having an approximate amine value of 204 mg KOH/g, a low diethyl fumarate content; |
| DIASPARTATE D | a diaspartate prepared from a proprietary blend of amine(s) and diethyl maleate having an approximate amine value of 190 mg KOH/g; |
| DIASPARTATE E | a diaspartate prepared from isophorone diamine and diethyl maleate having an approximate amine value of 218 mg KOH/g; and |
| POLYAMINE A | a diamine of 4, 4'-diaminodicyclohexylmethane (PACM-20) with an amine value of 533 mg KOH/g. |

To demonstrate initial proof of concept of the invention, two systems, DIASPARTATE A/POLYISOCYANATE A=42.3/57.7 (weight ratio, NCO: OH=1.05), and DIASPARTATE A/POLYISOCYANATE C=28.6/71.4 (weight ratio, NCO: OH=1.05), were mixed and applied to an untreated polyethylene terephthalate (PET) film (one-side application), then laminated with one PET film (untreated) under 5 bar roll pressure at room temperature (~25° C.). The laminated films were settled at room temperature for 24 hours. The laminate made with DIASPARTATE A/POLYISOCYANATE C had a peel force of 907 g/inch. while the laminate made with DIASPARTATE A/POLYISOCYANATE A had a peel force of 389 g/inch.

GENERAL ADHESIVE PREPARATION AND TESTING PROCEDURES

Bond Strength

In the following Examples, the isocyanate functional material and either the amino or hydroxyl functional material were combined at 23° C. at an NCO/(OH or NH) ratio of 1.1 to 1.0. The samples were diluted to 50% solids using dry ETHYL ACETATE to assure consistent adhesive application thickness between samples. Each formulation was applied to corona-treated polyethylene terephthalate (PET) film using a wire wound rod, resulting in a dry adhesive film weight of between 2.5-5.0 g/m². The samples were dried at 60° C. for 60 seconds, then laminated to corona-treated PET, metalized PET (MPET), corona-treated cast polypropylene (cPP) and aluminum foil (Al) using a hot roll laminator at 50 psig, 65° C. traveling at two feet per minute.

Bond strength measurements, according to ASTM D 1876-01, were conducted using an INSTRON machine at a peel rate of 12 in/min. at time intervals of four hours, one day, seven days and 14 days after lamination. All results are given in g/in. with failure modes designated as follows: ST is "Substrate Tear" meaning one or more of the substrates tore during analysis; P is "Peel" meaning the sample smoothly peeled during analysis; Z is "Zipper" meaning the sample rapidly increased and decreased in bond strength during analysis; C is "Cohesive" meaning the adhesive split during analysis partially staying adhered to both substrates; and AF is "Adhesive Failure" meaning the adhesive completely and cleanly separated from one of the two substrates during analysis. Bond strength results are presented in the Tables. In various embodiments of the invention, the laminates developed acceptable bond strength—defined for the purposes of the invention as having a minimum of 150 g/in. measured @ 23° C. according to ASTM D 1876-01 or substrate tear—in less than five days at 23° C., in some embodiments, in from one to five days at 23° C. and in certain embodiments in less than one day at 23° C.

Pot-Life

In the following Examples, the isocyanate functional material and either the amino or hydroxyl functional material were combined at 23° C. at an NCO/(OH or NH) ratio of 1.1:1.0. The samples were then diluted using dry ETHYL ACETATE to a viscosity of 18 seconds in a #2 EZ Zahn cup. Viscosity was monitored according to ASTM D4212-16 at 23° C. and recorded at time intervals of initial, one hour, two hours, four hours and eight hours. All results are given in seconds (s). In the present invention, a sample having a viscosity of 60 seconds or less after four hours was deemed to have an acceptable pot life.

Comparative Example 1

POLYISOCYANATE G (17.2 g) was added to POLYESTER A (82.8 g) and mixed for 60 seconds until homogeneous. Table I provides bond strength measurements. Viscosity measurements were, initial: 19 s; one hour: 19 s; two hours: 20 s; four hours: 20 s; and eight hours: 20 s.

TABLE I

| | Bond Strength (g/in.) | | | |
|---|---|---|---|---|
| Laminate Structure | 4 Hours | 1 Day | 7 Days | 14 Days |
| PET/PET | 0 C | 26 C | 441 AF | 475 AF |
| PET/MPET | 0 C | 26 C | 795 ST | 829 ST |
| PET/cPP | 26 C | 26 C | 769 AF | 994 AF |
| PET/Al | 52 C | 65 C | 484 AF | 562 AF |

Note:
ST = Substrate Tear;
P = Peel;
Z = Zipper;
C = Cohesive; and
AF = Adhesive Failure

Comparative Example 2

POLYISOCYANATE B (26.6 g) was added to POLYESTER A (73.4 g) and mixed for 60 seconds until homogeneous. Table II provides bond strength measurements. Viscosity measurements were, initial: 19 s; one hour: 19 s; two hours: 19 s; four hours: 19 s; and eight hours: 20 s.

TABLE II

| | Bond Strength (g/in.) | | | |
|---|---|---|---|---|
| Laminate Structure | 4 Hours | 1 Day | 7 Days | 14 Days |
| PET/PET | 0 $^C$ | 26 $^C$ | 164 $^C$ | 778 $^{AF}$ |
| PET/MPET | 0 $^C$ | 0 $^C$ | 415 $^C$ | 769 $^{AF}$ |
| PET/cPP | 0 $^C$ | 17 $^C$ | 350 $^C$ | 804 $^{AF}$ |
| PET/Al | 26 $^C$ | 52 $^C$ | 622 $^C$ | 916 $^{AF}$ |

Note:
ST = Substrate Tear;
P = Peel;
Z = Zipper;
C = Cohesive; and
AF = Adhesive Failure Comparative Example 3

POLYISOCYANATE H (22.1 g) was added to POLYESTER A (77.9 g) and mixed for 60 seconds until homogeneous. Table III provides bond strength measurements. Viscosity measurements were, initial: 19 s; one hour: 19 s; two hours: 19 s; four hours: 19 s; and eight hours: 20 s.

TABLE III

| | Bond Strength (g/in.) | | | |
|---|---|---|---|---|
| Laminate Structure | 4 Hours | 1 Day | 7 Days | 14 Days |
| PET/PET | 26 $^C$ | 639 $^{ST}$ | 804 $^{ST}$ | 752 $^{ST}$ |
| PET/MPET | 26 $^C$ | 942 $^{ST}$ | 700 $^{ST}$ | 674 $^{ST}$ |
| PET/cPP | 52 $^C$ | 1002 $^{AF}$ | 1305 $^{AF}$ | 1149 $^{AF}$ |
| PET/Al | 91 $^C$ | 976 $^{AF}$ | 665 $^{AF}$ | 717 $^{AF}$ |

Note:
ST = Substrate Tear;
P = Peel;
Z = Zipper;
C = Cohesive; and
AF = Adhesive Failure Comparative Example 4

POLYISOCYANATE G (44.3 g) was added to DIASPARTATE B (55.7 g) and mixed for 60 seconds until homogeneous. Table IV provides bond strength measurements. Viscosity measurements were, initial: 18 s; one hour: 28 s; two hours: 150 s; four hours: gel; and eight hours; gel.

TABLE IV

| | Bond Strength (g/in.) | | | |
|---|---|---|---|---|
| Laminate Structure | 4 Hours | 1 Day | 7 Days | 14 Days |
| PET/PET | 181 $^{AF}$ | 493 $^{ST}$ | 1063 $^{ST}$ | 518 $^{ST}$ |
| PET/MPET | 181 $^{AF}$ | 78 $^C$ | 596 $^{ST}$ | 207 $^{ST}$ |
| PET/cPP | 104 $^{AF}$ | 181 $^C$ | 155 $^{AF}$ | 130 $^{AF}$ |
| PET/Al | 104 $^{AF}$ | 26 $^{AF}$ | 104 $^{AF}$ | 181 $^{AF}$ |

Note:
ST = Substrate Tear;
P = Peel;
Z = Zipper;
C = Cohesive; and
AF = Adhesive Failure Comparative Example 5

POLYISOCYANATE B (77.8 g) was added to POLYAMINE A (22.2 g) and immediately gelled. Due to the immediate reaction of the materials, neither bond strength nor viscosity could be measured because the pot-life was essentially zero.

Comparative Example 6

POLYISOCYANATE D (92.2 g) was added to POLYAMINE A (7.8 g) and immediately gelled. Due to the immediate reaction of the materials, neither bond strength nor viscosity could be measured because the pot-life was essentially zero.

Example 7

POLYISOCYANATE B (55.6 g) was added to DIASPARTATE D (44.4 g) and mixed for 60 seconds until homogeneous. Table V provides bond strength measurements. Viscosity measurements were, initial: 16 s; one hour: 17 s; two hours: 17 s; four hours: 17 s; and eight hours; 17 s.

TABLE V

| | Bond Strength (g/in.) | | | |
|---|---|---|---|---|
| Laminate Structure | 4 Hours | 1 Day | 7 Days | 14 Days |
| PET/PET | 104 $^C$ | 337 $^{ST}$ | 415 $^{ST}$ | 415 $^{ST}$ |
| PET/MPET | 242 $^C$ | 726 $^{ST}$ | 337 $^{ST}$ | 337 $^{ST}$ |
| PET/cPP | 190 $^C$ | 786 $^C$ | 1452 $^{AF}$ | 1538 $^{AF}$ |
| PET/Al | 492 $^C$ | 657 $^C$ | 665 $^{AF}$ | 639 $^{AF}$ |

Note:
ST = Substrate Tear;
P = Peel;
Z = Zipper;
C = Cohesive; and
AF = Adhesive Failure Example 8

POLYISOCYANATE C (73.4 g) was added to DIASPARTATE B (26.6 g) and mixed for 60 seconds until homogeneous. Table VI provides bond strength measurements. Viscosity measurements were, initial: 18 s; one hour: 18 s; two hours: 18 s; four hours: 19 s; and eight hours; 20 s.

TABLE VI

| | Bond Strength (g/in.) | | | |
|---|---|---|---|---|
| Laminate Structure | 4 Hours | 1 Day | 7 Days | 14 Days |
| PET/PET | 207 $^C$ | 268 $^C$ | 207 $^{AF}$ | 199 $^{AF}$ |
| PET/MPET | 570 $^C$ | 441 $^{AF}$ | 458 $^{AF}$ | 397 $^{AF}$ |
| PET/cPP | 337 $^C$ | 639 $^{AF}$ | 207 $^{AF}$ | 199 $^{AF}$ |
| PET/Al | 458 $^C$ | 294 $^{AF}$ | 259 $^{AF}$ | 259 $^{AF}$ |

Note:
ST = Substrate Tear;
P = Peel;
Z = Zipper;
C = Cohesive; and
AF = Adhesive Failure Example 9

POLYISOCYANATE C (73.8 g) was added to DIASPARTATE C (26.2 g) and mixed for 60 seconds until homogeneous. Table VII provides bond strength measurements. Viscosity measurements were, initial: 18 s; one hour: 18 s; two hours: 18 s; four hours: 19 s; and eight hours; 20 s.

TABLE VII

| Laminate Structure | Bond Strength (g/in.) | | | |
|---|---|---|---|---|
| | 4 Hours | 1 Day | 7 Days | 14 Days |
| PET/PET | 207 $^{AF}$ | 259 $^{AF}$ | 225 $^{AF}$ | 181 $^{AF}$ |
| PET/MPET | 570 $^{AF}$ | 475 $^{AF}$ | 415 $^{AF}$ | 372 $^{AF}$ |
| PET/cPP | 458 $^{AF}$ | 665 $^{AF}$ | 553 $^{AF}$ | 579 $^{AF}$ |
| PET/Al | 320 $^{AF}$ | 346 $^{AF}$ | 207 $^{AF}$ | 233 $^{AF}$ |

Note:
ST = Substrate Tear;
P = Peel;
Z = Zipper;
C = Cohesive; and
AF = Adhesive Failure Example 10

POLYISOCYANATE C (72.3 g) was added to DIASPARTATE D (27.7 g) and mixed for 60 seconds until homogeneous. Table VIII provides bond strength measurements. Viscosity measurements were, initial: 18 s; one hour: 18 s; two hours: 18 s; four hours: 18 s; and eight hours: 18 s.

TABLE VIII

| Laminate Structure | Bond Strength (g/in.) | | | |
|---|---|---|---|---|
| | 4 Hours | 1 Day | 7 Days | 14 Days |
| PET/PET | 86 $^{C}$ | 199 $^{C}$ | 233 $^{AF}$ | 216 $^{AF}$ |
| PET/MPET | 164 $^{C}$ | 501 $^{AF}$ | 406 $^{AF}$ | 363 $^{AF}$ |
| PET/cPP | 164 $^{C}$ | 458 $^{AF}$ | 475 $^{AF}$ | 389 $^{AF}$ |
| PET/Al | 199 $^{C}$ | 294 $^{AF}$ | 173 $^{AF}$ | 216 $^{AF}$ |

Note:
ST = Substrate Tear;
P = Peel;
Z = Zipper;
C = Cohesive; and
AF = Adhesive Failure Example 11

POLYISOCYANATE C (73.2 g) was added to DIASPARTATE E (26.8 g) and mixed for 60 seconds until homogeneous. Table IX provides bond strength measurements. Viscosity measurements were, initial: 18 s; one hour: 18 s; two hours: 19 s; four hours: 20 s; and eight hours: 22 s.

TABLE IX

| Laminate Structure | Bond Strength (g/in.) | | | |
|---|---|---|---|---|
| | 4 Hours | 1 Day | 7 Days | 14 Days |
| PET/PET | 190 $^{AF}$ | 156 $^{AF}$ | 199 $^{AF}$ | 156 $^{AF}$ |
| PET/MPET | 518 $^{AF}$ | 458 $^{AF}$ | 423 $^{AF}$ | 406 $^{AF}$ |
| PET/cPP | 372 $^{AF}$ | 207 $^{AF}$ | 207 $^{AF}$ | 181 $^{AF}$ |
| PET/Al | 285 $^{AF}$ | 259 $^{AF}$ | 225 $^{AF}$ | 216 $^{AF}$ |

Note:
ST = Substrate Tear;
P = Peel;
Z = Zipper;
C = Cohesive; and
AF = Adhesive Failure Example 12

POLYISOCYANATE D (81.7 g) was added to DIASPARTATE B (18.3 g) and mixed for 60 seconds until homogeneous. Table X provides bond strength measurements. Viscosity measurements were, initial: 18 s; one hour: 18 s; two hours: 18 s; four hours: 18 s; and eight hours; 18 s.

TABLE X

| Laminate Structure | Bond Strength (g/in.) | | | |
|---|---|---|---|---|
| | 4 Hours | 1 Day | 7 Days | 14 Days |
| PET/PET | 0 $^{C}$ | 397 $^{C}$ | 389 $^{AF}$ | 397 $^{AF}$ |
| PET/MPET | 9 $^{C}$ | 683 $^{AF}$ | 778 $^{AF}$ | 791 $^{AF}$ |
| PET/cPP | 26 $^{C}$ | 579 $^{AF}$ | 700 $^{AF}$ | 657 $^{AF}$ |
| PET/Al | 52 $^{C}$ | 631 $^{AF}$ | 492 $^{AF}$ | 475 $^{AF}$ |

Note:
ST = Substrate Tear;
P = Peel;
Z = Zipper;
C = Cohesive; and
AF = Adhesive Failure Example 13

POLYISOCYANATE D (82.0 g) was added to DIASPARTATE C (18.0 g) and mixed for 60 seconds until homogeneous. Table XI provides bond strength measurements. Viscosity measurements were, initial: 18 s; one hour: 18 s; two hours: 18 s; four hours: 18 s; and eight hours: 18 s.

TABLE XI

| Laminate Structure | Bond Strength (g/in.) | | | |
|---|---|---|---|---|
| | 4 Hours | 1 Day | 7 Days | 14 Days |
| PET/PET | 0 $^{C}$ | 441 $^{C}$ | 415 $^{AF}$ | 432 $^{AF}$ |
| PET/MPET | 69 $^{C}$ | 700 $^{AF}$ | 821 $^{AF}$ | 812 $^{AF}$ |
| PET/cPP | 17 $^{C}$ | 415 $^{C}$ | 631 $^{AF}$ | 683 $^{AF}$ |
| PET/Al | 0 $^{C}$ | 639 $^{AF}$ | 484 $^{AF}$ | 467 $^{AF}$ |

Note:
ST = Substrate Tear;
P = Peel;
Z = Zipper;
C = Cohesive; and
AF = Adhesive Failure Example 14

POLYISOCYANATE D (81.5 g) was added to DIASPARTATE E (18.5 g) and mixed for 60 seconds until homogeneous. Table XII provides bond strength measurements. Viscosity measurements were, initial: 18 s; one hour: 18 s; two hours: 18 s; four hours: 18 s; and eight hours: 18 s.

TABLE XII

| Laminate Structure | Bond Strength (g/in.) | | | |
|---|---|---|---|---|
| | 4 Hours | 1 Day | 7 Days | 14 Days |
| PET/PET | 0 $^{C}$ | 389 $^{C}$ | 294 $^{AF}$ | 363 $^{AF}$ |
| PET/MPET | 0 $^{C}$ | 657 $^{C}$ | 700 $^{AF}$ | 760 $^{AF}$ |
| PET/cPP | 9 $^{C}$ | 536 $^{AF}$ | 734 $^{AF}$ | 881 $^{AF}$ |
| PET/Al | 26 $^{C}$ | 501 $^{AF}$ | 518 $^{AF}$ | 475 $^{AF}$ |

Note:
ST = Substrate Tear;
P = Peel;

TABLE XII-continued

| | Bond Strength (g/in.) | | | |
|---|---|---|---|---|
| Laminate Structure | 4 Hours | 1 Day | 7 Days | 14 Days |

Z = Zipper;
C = Cohesive; and
AF = Adhesive Failure

Example 15

POLYISOCYANATE E (53.4 g) was added to DIASPARTATE D (46.6 g) and mixed for 60 seconds until homogeneous. Table XIII provides bond strength measurements. Viscosity measurements were, initial: 20 s; one hour: 24 s; two hours: 31 s; four hours: 45 s; and eight hours; 68 s.

TABLE XIII

| | Bond Strength (g/in.) | | | |
|---|---|---|---|---|
| Laminate Structure | 4 Hours | 1 Day | 7 Days | 14 Days |
| PET/PET | 337 $^C$ | 570 $^C$ | 493 $^C$ | 441 $^C$ |
| PET/MPET | 709 $^C$ | 976 $^C$ | 804 $^C$ | 907 $^C$ |
| PET/cPP | 604 $^C$ | 976 $^C$ | 700 $^C$ | 700 $^C$ |
| PET/Al | 786 $^C$ | 760 $^{AF}$ | 687 $^C$ | 674 $^C$ |

Note:
ST = Substrate Tear;
P = Peel;
Z = Zipper;
C = Cohesive; and
AF = Adhesive Failure Example 16

POLYISOCYANATE F (61.5 g) was added to DIASPARTATE D (38.5 g) and mixed for 60 seconds until homogeneous. Table XIV provides bond strength measurements. Viscosity measurements were, initial: 17 s; one hour: 18 s; two hours: 19 s; four hours: 23 s; and eight hours; 33 s.

TABLE XIV

| | Bond Strength (g/in.) | | | |
|---|---|---|---|---|
| Laminate Structure | 4 Hours | 1 Day | 7 Days | 14 Days |
| PET/PET | 69 $^C$ | 812 $^C$ | 674 $^{AF}$ | 998 $^{AF}$ |
| PET/MPET | 104 $^C$ | 1201 $^C$ | 1167 $^{AF}$ | 1037 $^{AF}$ |
| PET/cPP | 104 $^C$ | 1106 $^C$ | 985 $^{AF}$ | 959 $^{AF}$ |
| PET/Al | 207 $^C$ | 1115 $^C$ | 635 $^{AF}$ | 1011 $^{AF}$ |

Note:
ST = Substrate Tear;
P = Peel;
Z = Zipper;
C = Cohesive; and
AF = Adhesive Failure Example 17

POLYISOCYANATE G (24.6 g) was added to DIASPARTATE B (16.2) and POLYOL A (59.2 g) and mixed for 60 seconds until homogeneous. Table XV provides bond strength measurements. Viscosity measurements were, initial: 18 s; one hour: 19 s; two hours: 21 s; four hours: 25 s; and eight hours 32 s.

TABLE XV

| | Bond Strength (g/in.) | | | |
|---|---|---|---|---|
| Laminate Structure | 4 Hours | 1 Day | 7 Days | 14 Days |
| PET/PET | 130 $^C$ | 156 $^C$ | 570 $^Z$ | NA |
| PET/MPET | 458 $^C$ | 518 $^C$ | 648 $^C$ | NA |
| PET/cPP | 285 $^C$ | 337 $^C$ | 1011 $^Z$ | NA |
| PET/Al | 505 $^C$ | 544 $^C$ | 467 $^{AF}$ | NA |

Note:
ST = Substrate Tear;
P = Peel;
Z = Zipper;
C = Cohesive; and
AF = Adhesive Failure Example 18

POLYISOCYANATE C (63.7 g) was added to DIASPARTATE B (18.1 g) and POLYOL A (18.1 g) and mixed for 60 seconds until homogeneous. Table XVI provides bond strength measurements. Viscosity measurements were, initial: 17 s; one hour: 18 s; two hours: 20 s; four hours: 23 s; and eight hours 65 s.

TABLE XVI

| | Bond Strength (g/in.) | | | |
|---|---|---|---|---|
| Laminate Structure | 4 Hours | 1 Day | 7 Days | 14 Days |
| PET/PET | 147 $^{AF}$ | 199 $^{AF}$ | 220 $^{AF}$ | NA |
| PET/MPET | 509 $^{AF}$ | 510 $^{AF}$ | 389 $^{AF}$ | NA |
| PET/cPP | 311 $^{AF}$ | 354 $^{AF}$ | 363 $^{AF}$ | NA |
| PET/Al | 302 $^{AF}$ | 311 $^{AF}$ | 272 $^{AF}$ | NA |

Note:
ST = Substrate Tear;
P = Peel;
Z = Zipper;
C = Cohesive; and
AF = Adhesive Failure Table XVII provides a summary of the Examples. Comparative Examples 1 and 2 were made with POLYISOCYANATE G and POLYISOCYANATE B, respectively, with POLYESTER A and represented a typical aliphatic based two component (2K) formulation that could be used in a laminating adhesive application. The pot-lives of these examples were acceptable as the viscosity of these systems was <60 seconds four hours after combining the components. The evaluation of the bond strength data revealed that the development of bond strength fell outside the acceptable range and thus Comparative Examples 1 and 2 did not meet the specified criteria.

Comparative Example 3 was made with POLYISOCYANATE H with POLYESTER A and represented a typical aromatic based two component (2K) formulation that could be used in a laminating adhesive application. The pot-life of this example was acceptable as the viscosity of this system was <60 seconds four hours after combining the components. The development of bond strength met the specified criteria. However, POLYISOCYANATE H was an aromatic isocyanate-based adhesive, so the potential exists for primary aromatic amine (PAA) generation and migration and thus Comparative Example 3 did not meet the specified criteria.

Comparative Example 4 was made with DIASPARTATE B with POLYISOCYANATE G. This example did not have suitable adhesive properties as evidenced by the low adhesive bond strengths and demonstrated an unsuitable pot-life.

Comparative examples 5 and 6 were made with POLYISOCYANATE B and POLYISOCYANATE D, respectively prepolymer reacted with a mixutre of a polyaspartate and a polyol.

TABLE XVII

| Ex. | Potential PAA* migration | Components | Viscosity remained below 60 seconds @ 23° C. after 4 hours | Time for bond strength to reach a minimum of 150 g/in. or substrate tear @ 23° C. (days) | Comments |
|---|---|---|---|---|---|
| C1 | No | POLYISOCYANATE G + POLYESTER A | Yes | 7 | Current aliphatic isocyanate laminating adhesive standard had unacceptably slow bond strength development |
| C2 | No | POLYISOCYANATE B + POLYESTER A | Yes | 7 | Current aliphatic isocyanate laminating adhesive standard had unacceptably slow bond strength development |
| C3 | Yes | POLYISOCYANATE H + POLYESTER A | Yes | 1 | Current aromatic isocyanate laminating adhesive standard - achieved minimum thresholds for pot life and bond strength but had potential for primary aromatic amine formation |
| C4 | No | POLYISOCYANATE G + DIASPARTATE B | No | — | Did not achieve the minimum bond strength or pot-life threshold |
| C5 | No | POLYISOCYANATE B + POLYAMINE A | No | — | Did not achieve the minimum bond strength or pot-life threshold |
| C6 | No | POLYISOCYANATE D + POLYAMINE A | No | — | Did not achieve the minimum bond strength or pot-life threshold |
| 7 | No | POLYISOCYANATE B + DIASPARTATE D | Yes | 1 | Achieved minimum thresholds for pot life and bond strength |
| 8 | No | POLYISOCYANATE C + DIASPARTATE B | Yes | 0.17 | Achieved minimum thresholds for pot life and bond strength |
| 9 | No | POLYISOCYANATE C + DIASPARTATE C | Yes | 0.17 | Achieved minimum thresholds for pot life and bond strength |
| 10 | No | POLYISOCYANATE C + DIASPARTATE D | Yes | 1 | Achieved minimum thresholds for pot life and bond strength |
| 11 | No | POLYISOCYANATE C + DIASPARTATE E | Yes | 0.17 | Achieved minimum thresholds for pot life and bond strength |
| 12 | No | POLYISOCYANATE D + DIASPARTATE B | Yes | 1 | Achieved minimum thresholds for pot life and bond strength |
| 13 | No | POLYISOCYANATE D + DIASPARTATE C | Yes | 1 | Achieved minimum thresholds for pot life and bond strength |
| 14 | No | POLYISOCYANATE D + DIASPARTATE E | Yes | 1 | Achieved minimum thresholds for pot life and bond strength |
| 15 | No | POLYISOCYANATE E + DIASPARTATE D | Yes | 0.17 | Achieved minimum thresholds for pot life and bond strength |
| 16 | No | POLYISOCYANATE F + DIASPARTATE D | Yes | 1 | Achieved minimum thresholds for pot life and bond strength |
| 17 | No | POLYISOCYANATE G + DIASPARTATE B + POLYOL A | Yes | 1 | Achieved minimum thresholds for pot life and bond strength |
| 18 | No | POLYISOCYANATE C + DIASPARTATE B + POLYOL A | Yes | 1 | Achieved minimum thresholds for pot life and bond strength |

*PAA = Primary aromatic amine cured with POLYAMINE A. The immediate gelation of these examples demonstrated essentially zero pot-life and thus did not meet the specified criteria.

Examples 7-16 all demonstrated suitable pot-life based on the criteria as outlined, i.e., viscosity measured according to ASTM D4212-16 remaining below 60 seconds @ 23° C. four hours after combining the components.

Examples 7-16 also met the bond strength development criteria, i.e., a minimum of 150 g/in. measured @ 23° C. according to ASTM D 1876-01 or substrate tear, in less than or equal to five days after the substrate was laminated with the adhesive.

Examples 17 and 18 demonstrated acceptable pot-life and bond strength development in adhesives made with an aliphatic polyisocyanate or aliphatic isocyanate terminated This specification has been written with reference to various non-limiting and non-exhaustive embodiments. However, it will be recognized by persons having ordinary skill in the art that various substitutions, modifications, or combinations of any of the disclosed embodiments (or portions thereof) may be made within the scope of this specification. Thus, it is contemplated and understood that this specification supports additional embodiments not expressly set forth herein. Such embodiments may be obtained, for example, by combining, modifying, or reorganizing any of the disclosed steps, components, elements, features, aspects, characteristics, limitations, and the like, of the various non-limiting embodiments described in this specification. In this manner, Applicant reserves the right to amend the claims during prosecution to add features as variously described in this specification, and such amendments comply with the requirements of 35 U.S.C. § 112(a), and 35 U.S.C. § 132(a).

Various aspects of the subject matter described herein are set out in the following numbered clauses:

Clause 1. An adhesive comprising a reaction product of (A) an isocyanate-terminated prepolymer having an NCO group content of from 3% to 25% and an average functionality of 2 to 6, comprising a reaction product of (A1) an aliphatic isocyanate having an NCO group content of 18 to 64 and (A2) a polyol or polyamine having a molecular weight of from 400 to 4000; and (B) a polyaspartate compound according to formula (I)

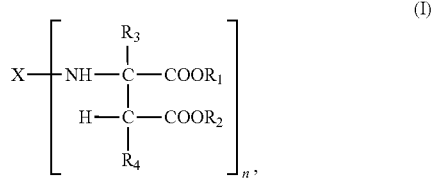

wherein, X represents a linear or branched aliphatic group obtained by removing amino groups from a linear or branched aliphatic polyamine, $R_1$ and $R_2$ are identical or different and represent organic groups which are inert towards isocyanate groups at a temperature of 100° C. or less, $R_3$ and $R_4$ are identical or different and represent hydrogen or organic groups which are inert towards isocyanate groups at a temperature of 100° C. or less, n represents an integer with a value of at least 2, wherein viscosity of the adhesive, as measured @ 23° C. according to ASTM D4212-16, remains below 60 seconds after four hours, and wherein the adhesive develops an acceptable bond strength to a substrate, defined as having a minimum of 150 g/in. measured @ 23° C. according to ASTM D 1876-01 or substrate tear, in less than or equal to five days after the substrate is laminated with the adhesive.

Clause 2. The adhesive according to Clause 1 further including (C), a polyol having a molecular weight of from 400 to 4000.

Clause 3. The adhesive according to one of Clauses 1 and 2, wherein (A2), the polyol or the polyamine is based on one of a polyether, a polyester, a polycarbonate, a polycarbonate ester, a polycaprolactone, and a polybutadiene.

Clause 4. The adhesive according to any one of Clauses 1 to 3, wherein polyol (C) is based on one of a polyether, a polyester, a polycarbonate, a polycarbonate ester, a polycaprolactone, and a polybutadiene.

Clause 5. The adhesive according to any one of Clauses 1 to 4, wherein the adhesive develops an acceptable bond strength to a substrate, defined as having a minimum of 150 g/in. measured @ 23° C. according to ASTM D 1876-01 or substrate tear, in less than or equal to one day after the substrate is laminated with the adhesive.

Clause 6. The adhesive according to any one of Clauses 1 to 5, wherein the aliphatic polyisocyanate (A1) is selected from the group consisting of 1,4-tetramethylene diisocyanate, 1,5-pentamethylene diisocyanate (PDI), 1,6-hexamethylene diisocyanate (HDI), 2,2,4-trimethyl-hexamethylene diisocyanate, dodecamethylene diisocyanate, 2-methyl-1,5-diisocyanatopentane, 1,4-diisocyanatocyclohexane, 5-isocyanato-1-(isocyanatomethyl)-1,3,3-trimethylcyclohexane (IPDI), 2,4-diisocyanato-dicyclohexyl-methane, 4,4'-diisocyanato-dicyclohexyl-methane, 1,3-bis (isocyanatomethyl)-cyclohexane, 1,4-bis (isocyanatomethyl)-cyclohexane, 1-isocyanato-1-methyl-3(4)-isocyanatomethyl-cyclohexane (IMCI), bis(4-isocyanato-3-methyl-cyclohexyl)-methane, 1,4-cyclohexane diisocyanate (CHDI), timers, isocyanurates, uretdiones, biurets, allophanates, iminooxadiazine diones, carbodiimides, oxadiazine triones, and prepolymers of any of these, and mixtures thereof.

Clause 7. The adhesive according to any one of Clauses 1 to 6, wherein X represents a group obtained by removing the amino groups from 1,4-diaminobutane, 1,6-diaminohexane, 2-methyl-1,5-pentane diamine, 2,2,4- and 2,4,4-trimethyl-1,6-diamino-hexane, 1,3-cyclohexane diamine, 1,4-cyclohexane diamine, 3-(aminomethyl)-3,5,5-trimethyl-cyclohexan-1-amine, 2,4-hexahydrotoluylene diamine, 2,6-hexahydrotoluylene diamine, 4,4'-diamino-dicyclohexyl methane, 3,3'-dimethyl-4,4'-diamino-dicyclohexyl-methane, and 3,3'-diethyl-4,4'-diamino-dicyclohexyl methane.

Clause 8. The adhesive according to any one of Clauses 1 to 7, wherein $R_1$ and $R_2$ represent a methyl, ethyl, propyl, or butyl group, wherein $R_3$ and $R_4$ represent hydrogen, and wherein n is 2.

Clause 9. A process comprising reacting and curing the adhesive according to any one of Clauses 1 to 8.

Clause 10. A substrate having applied thereto the adhesive according to any one of Clauses 1 to 9.

Clause 11. The substrate according to Clause 10, wherein the substrate is selected from the group consisting of aluminum, copper, and steel, thermoplastic polymers, wood, cement, concrete, and glass.

Clause 12. A multi-layered laminated film comprising a layer of the adhesive according to one of Clauses 1 to 8 applied to one or more substrate layers, each layer independently having a thickness of from 5 μm to 250 μm, wherein the multi-layered laminated film has a total thickness of from 20 μm to 750 μm.

Clause 13. The multi-layered laminated film according to Clause 12, wherein the one or more substrate layers are independently selected from the group consisting of paper, metal and thermoplastic polymers.

Clause 14. The multi-layered laminated film according to Clause 13, wherein the metal is selected from the group consisting of aluminum, copper, and steel.

Clause 15. The multi-layered laminated film according to one of Clauses 13 and 14, wherein the thermoplastic polymer is independently selected from the group consisting of polyethylene, polyethylene terephthalate, corona-treated polyethylene terephthalate, metalized polyethylene terephthalate, and corona-treated polypropylene.

Clause 16. A flexible packaging material comprising the multi-layered laminated film according to one of Clauses 12 to 15.

Clause 17. A process of minimizing aromatic amine migration in a packaging material, the process comprising: applying the adhesive according to one of Clauses 1 to 8 to a packaging material substrate, and curing the adhesive.

Clause 18. The process according to Clause 17, wherein the packaging material substrate comprises one or more layers selected from the group consisting of paper, metal and thermoplastic polymers.

Clause 19. The process according to Clause 18, wherein the thermoplastic polymers are independently selected from the group consisting of polyethylene, polyethylene terephthalate, corona-treated polyethylene, corona-treated polyethylene terephthalate, metalized polyethylene terephthalate, polypropylene, and corona-treated polypropylene.

Clause 20. An adhesive comprising a reaction product of (A1) an aliphatic isocyanate having an NCO group content of 18 to 64; (A2) a polyol or polyamine having a molecular weight of from 400 to 4000; and (B) a polyaspartate compound according to formula (I)

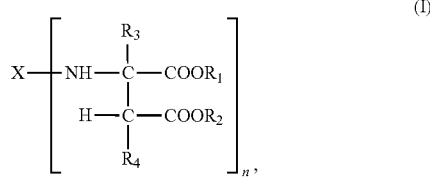

wherein, X represents a linear or branched aliphatic group obtained by removing amino groups from a linear or branched aliphatic polyamine, $R_1$ and $R_2$ are identical or different and represent organic groups which are inert towards isocyanate groups at a temperature of 100° C. or less, $R_3$ and $R_4$ are identical or different and represent hydrogen or organic groups which are inert towards isocyanate groups at a temperature of 100° C. or less, n represents an integer with a value of at least 2, wherein viscosity of the adhesive, as measured @ 23° C. according to ASTM D4212-16, remains below 60 seconds for after four hours, and wherein the adhesive develops an acceptable bond strength to a substrate, defined as having a minimum of 150 g/in. measured @ 23° C. according to ASTM D 1876-01 or substrate tear, in less than or equal to five days after the substrate is laminated with the adhesive.

Clause 21. The adhesive according to Clause 20, wherein (A2), the polyol or the polyamine is based on one of a polyether, a polyester, a polycarbonate, a polycarbonate ester, a polycaprolactone, and a polybutadiene.

Clause 22. The adhesive according to one of Clauses 20 and 21, wherein the adhesive develops an acceptable bond strength to a substrate, defined as having a minimum of 150 g/in. measured @ 23° C. according to ASTM D 1876-01 or substrate tear, in less than or equal to one day after the substrate is laminated with the adhesive.

Clause 23. The adhesive according to any one of Clauses 20 to 22, wherein the aliphatic polyisocyanate (A1) is selected from the group consisting of 1,4-tetramethylene diisocyanate, 1,5-pentamethylene diisocyanate (PDI), 1,6-hexamethylene diisocyanate (HDI), 2,2,4-trimethyl-hexamethylene diisocyanate, dodecamethylene diisocyanate, 2-methyl-1,5-diisocyanatopentane, 1,4-diisocyanatocyclohexane, 5-isocyanato-1-(isocyanatomethyl)-1,3,3-trimethylcyclohexane (IPDI), 2,4-diisocyanato-dicyclohexyl-methane, 4,4'-diisocyanato-dicyclohexyl-methane, 1,3-bis(isocyanatomethyl)-cyclohexane, 1,4-bis (isocyanatomethyl)-cyclohexane, 1-isocyanato-1-methyl-3(4)-isocyanatomethyl-cyclohexane (IMCI), bis(4-isocyanato-3-methyl-cyclohexyl)-methane, 1,4-cyclohexane diisocyanate (CHDI), trimers, isocyanurates, uretdiones, biurets, allophanates, iminooxadiazine diones, carbodiimides, oxadiazine triones, and prepolymers of any of these, and mixtures thereof.

Clause 24. The adhesive according to any one of Clauses 20 to 23, wherein X represents a group obtained by removing the amino groups from 1,4-diaminobutane, 1,6-diaminohexane, 2-methyl-1,5-pentane diamine, 2,2,4- and 2,4,4-trimethyl-1,6-diamino-hexane, 1,3-cyclohexane diamine, 1,4-cyclohexane diamine, 3-(aminomethyl)-3,5,5-trimethylcyclohexan-1-amine, 2,4-hexahydrotoluylene diamine, 2,6-hexahydrotoluylene diamine, 4,4'-diamino-dicyclohexyl methane, 3,3'-dimethyl-4,4'-diamino-dicyclohexyl-methane, and 3,3'-diethyl-4,4'-diamino-dicyclohexyl methane.

Clause 25. The adhesive according to any one of Clauses 20 to 24, wherein $R_1$ and $R_2$ represent a methyl, ethyl, propyl, or butyl group, wherein $R_3$ and $R_4$ represent hydrogen, and wherein n is 2.

Clause 26. A process comprising reacting and curing the adhesive according to any one of Clauses 20 to 25.

Clause 27. A substrate having applied thereto the adhesive according to any one of Clauses 20 to 25.

Clause 28. The substrate according to Clause 27, wherein the substrate is selected from the group consisting of aluminum, copper, and steel, thermoplastic polymers, wood, cement, concrete, and glass.

Clause 29. A multi-layered laminated film comprising a layer of the adhesive according to one of Clauses 20 to 25 applied to one or more substrate layers, each layer independently having a thickness of from 5 μm to 250 μm, wherein the multi-layered laminated film has a total thickness of from 20 μm to 750 μm.

Clause 30. The multi-layered laminated film according to Clause 29, wherein the one or more substrate layers are independently selected from the group consisting of paper, metal and thermoplastic polymers.

Clause 31. The multi-layered laminated film according to Clause 30, wherein the metal is selected from the group consisting of aluminum, copper, and steel.

Clause 32. The multi-layered laminated film according to one of Clauses 30 and 31, wherein the thermoplastic polymer is independently selected from the group consisting of polyethylene, polyethylene terephthalate, corona-treated polyethylene terephthalate, metalized polyethylene terephthalate, and corona-treated polypropylene.

Clause 33. A flexible packaging material comprising the multi-layered laminated film according to one of Clauses 29 to 32.

Clause 34. A process of minimizing aromatic amine migration in a packaging material, the process comprising: applying the adhesive according to one of Clauses 20 to 25 to a packaging material substrate, and curing the adhesive.

Clause 35. The process according to Clause 34, wherein the packaging material substrate comprises one or more layers selected from the group consisting of paper, metal and thermoplastic polymers.

Clause 36. The process according to Clause 35, wherein the thermoplastic polymers are independently selected from the group consisting of polyethylene, polyethylene terephthalate, corona-treated polyethylene, corona-treated polyethylene terephthalate, metalized polyethylene terephthalate, polypropylene, and corona-treated polypropylene.

What is claimed is:

1. A multi-layered laminated film comprising one or more substrate layers and a layer of an adhesive comprising a reaction product of
   (A) an isocyanate-terminated prepolymer having an NCO group content of from 3% to 25% and an average functionality of 2 to 6, comprising a reaction product of
      (A1) an aliphatic isocyanate having an NCO group content of 18% to 64%, and
      (A2) a polyol or polyamine having a molecular weight of from 400 to 4000;

(B) a polyaspartate compound according to formula (I)

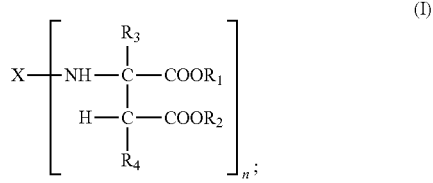

and
(C) a polyol having a molecular weight of from 400 to 4000, wherein,
X represents a linear or branched aliphatic group obtained by removing amino groups from a linear or branched aliphatic polyamine,
$R_1$ and $R_2$ are identical or different and represent organic groups which are inert towards isocyanate groups at a temperature of 100° C. or less,
$R_3$ and $R_4$ are identical or different and represent hydrogen or organic groups which are inert towards isocyanate groups at a temperature of 100° C. or less,
n represents an integer with a value of at least 2,
wherein viscosity of the adhesive, as measured @ 23° C. according to ASTM D4212-16, remains below 60 seconds after four hours,
wherein the adhesive develops an acceptable bond strength to a substrate, defined as having a minimum of 150 g/in. measured @ 23° C. according to ASTM D 1876-01 or substrate tear, in less than or equal to five days after the substrate is laminated with the adhesive, and
wherein the adhesive is applied to one or more of the substrate layers of the film.

2. The multi-layered laminated film according to claim 1, wherein (A2), the polyol or the polyamine is based on one of a polyether, a polyester, a polycarbonate, a polycarbonate ester, a polycaprolactone, and a polybutadiene.

3. The multi-layered laminated film according to claim 1, wherein polyol (C) is based on one of a polyether, a polyester, a polycarbonate, a polycarbonate ester, a polycaprolactone, and a polybutadiene.

4. The multi-layered laminated film according to claim 1, wherein the adhesive develops an acceptable bond strength to a substrate, defined as having a minimum of 150 g/in. measured @ 23° C. according to ASTM D 1876-01 or substrate tear, in less than or equal to one day after the substrate is laminated with the adhesive.

5. The multi-layered laminated film according to claim 1, wherein the aliphatic polyisocyanate (A1) is selected from the group consisting of 1,4-tetramethylene diisocyanate, 1,5-pentamethylene diisocyanate, 1,6-hexamethylene diisocyanate, 2,2,4-trimethyl-hexamethylene diisocyanate, dodecamethylene diisocyanate, 2-methyl-1,5-diisocyanatopentane, 1,4-diisocyanatocyclohexane, 5-isocyanato-1-(isocyanatomethyl)-1,3,3-trimethylcyclohexane, 2,4-diisocyanato-dicyclohexyl-methane, 4,4'-diisocyanato-dicyclohexyl-methane, 1,3-bis (isocyanatomethyl)-cyclohexane, 1,4-bis (isocyanatomethyl)-cyclohexane, 1-isocyanato-1-methyl-3(4)-isocyanatomethyl-cyclohexane, bis(4-isocyanato-3-methyl-cyclohexyl)-methane, 1,4-cyclohexane diisocyanate, trimers, isocyanurates, uretdiones, biurets, allophanates, iminooxadiazine diones, carbodiimides, oxadiazine triones, and prepolymers of any of these, and mixtures thereof.

6. The multi-layered laminated film according to claim 1, wherein X represents a group obtained by removing the amino groups from the group of compounds consisting of 1,4-diaminobutane, 1,6-diaminohexane, 2-methyl-1,5-pentane diamine, 2,2,4- and 2,4,4-trimethyl-1,6-diaminohexane, 1,3-cyclohexane diamine, 1,4-cyclohexane diamine, 3-(aminomethyl)-3,5,5-trimethylcyclohexan-1-amine, 2,4-hexahydrotoluylene diamine, 2,6-hexahydrotoluylenediamine, 4,4'-diamino-dicyclohexyl methane, 3,3'-dimethyl-4,4'-diamino-dicyclohexyl-methane, and 3,3'-diethyl-4,4'-diamino-dicyclohexyl methane.

7. The multi-layered laminated film according to claim 1, wherein $R_1$ and $R_2$ represent a methyl, ethyl, propyl, or butyl group, wherein $R_3$ and $R_4$ represent hydrogen, and wherein n is 2.

8. The multi-layered laminated film according to claim 1, wherein each layer has a thickness of from 5 μm to 250 μm.

9. The multi-layered laminated film according to claim 1, wherein the multi-layered laminated film has a total thickness of from 20 μm to 750 μm.

10. The multi-layered laminated film according to claim 1, wherein one of the substrate layers is selected from the group consisting of paper, metal and thermoplastic polymers.

11. The multi-layered laminated film according to claim 10, wherein the metal is selected from the group consisting of aluminum, copper, and steel.

12. The multi-layered laminated film according to claim 10, wherein the thermoplastic polymer is independently selected from the group consisting of polyethylene, polyethylene terephthalate, corona-treated polyethylene terephthalate, metalized polyethylene terephthalate, and corona-treated polypropylene.

13. The multi-layered laminated film according to claim 1, wherein the adhesive is applied to each of the substrate layers of the film.

14. The multi-layered laminated film according to claim 1, wherein each of the one or more substrate layers are independently selected from the group consisting of paper, metal and thermoplastic polymers.

15. A flexible packaging material comprising the multi-layered laminated film according to claim 10.

* * * * *